March 30, 1954

C. E. ALLEMAN 2,673,786

METHOD AND APPARATUS FOR CONVERTING AND
QUENCHING HYDROCARBONS

Filed Oct. 17, 1949

INVENTOR.
C. E. ALLEMAN

BY Hudson and Young

ATTORNEYS

INVENTOR.
C. E. ALLEMAN

BY *Hudson and Young*

ATTORNEYS

March 30, 1954  C. E. ALLEMAN  2,673,786
METHOD AND APPARATUS FOR CONVERTING AND
QUENCHING HYDROCARBONS
Filed Oct. 17, 1949  3 Sheets-Sheet 3

FIG. 7

INVENTOR.
C. E. ALLEMAN

BY Hudson and Young

ATTORNEYS

Patented Mar. 30, 1954

2,673,786

UNITED STATES PATENT OFFICE 2,673,786

METHOD AND APPARATUS FOR CONVERTING AND QUENCHING HYDROCARBONS

Carl E. Alleman, Cactus, Tex., assignor to Phillips Petroleum Company, a corporation of Delaware Application October 17, 1949, Serial No. 121,749

20 Claims. (Cl. 23—1)

This invention relates to pebble heat exchangers. In one of its more specific aspects it relates to a fluent solid material quench for reaction products in pebble heater apparatus. In another of its more specific aspects it relates to a method for preventing carbon lay-down in reaction chambers of pebble heater apparatus. In another of its more specific aspects it relates to improved pebble heat exchange apparatus.

Thermal conversion processes which are carried out in so-called pebble heater apparatus utilize a fluent mass of solid heat exchange material, which mass is heated to a high temperature by passing hot gas therethrough in a first direct heat exchange step and is then caused to contact gaseous reactant materials, furnishing heat thereto in a second direct exchange. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact the gaseous reactant materials in a second direct heat exchange relation, furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are passed upwardly through the cylindrical bed, sometimes being introduced thereinto at the periphery of the bed and at its lower end, and are sometimes introduced through a refractory arch which supports the moving pebble bed. At other times, heat is supplied to the heating chamber by supplying a fuel to the lower portion of the pebble bed within the heater chamber and burning the fuel on the surface of the pebbles so as to heat the pebbles by combustion and further heating the pebbles by passing the resulting combustion gas upwardly through the downflowing fluent mass of pebbles.

The heated pebbles are introduced into the upper portion of a reaction chamber and reactant materials are introduced into the lower portion of the reaction chamber and are caused to flow upwardly through the downflowing fluent hot pebble mass therein, thereby obtaining the heat required for thermal conversion of the reactant materials. Reaction products are removed from the upper portion of the reaction chamber generally at points above the top surface of the pebble bed. One disadvantage of the use of pebble heater apparatus for the conversion of hydrocarbon materials is the fact that the reaction products tend to accumulate in the space above the pebble bed and adjacent the surface of the reaction chamber and decompose so as to lay down carbon on the reaction chamber surface. The accumulation of carbon on the reaction chamber surface finally reaches such proportions as to seriously interfere with the removal of reaction products through the effluent outlet of the reaction chamber. Additional trouble is encountered when large fragments of the accumulated carbon separate from the surface of the reaction chamber, pass downwardly through the chamber with the fluent mass of pebbles and become lodged in the pebble outlet of the chamber, thus reducing or preventing the flow of pebbles through the pebble heater apparatus.

Pebbles of different temperatures which are introduced into a reaction chamber at different points in the top of the chamber to form a contiguous pebble bed therein do not move laterally or intermix materially of their own accord. Two different temperature areas are thus formed in vertical sections of the chamber. Gaseous materials tend to spread through the contiguous bed and thus encounter dissimilar heat exchange. Little success is encountered therefore when attempting to quench with cool pebbles introduced into a reactor chamber.

Broadly speaking, this invention comprises a means and method of reacting hydrocarbons whereby the accumulation of carbon in the upper portion of the reaction chamber is substantially prevented by the use of a flowing cool pebble mass in a quench chamber adjacent to the reaction chamber, the cool pebble mass in the quench chamber and the hot pebble mass in the reaction chamber forming a vertical interface at an opening in the quench chamber through which reaction products are admitted to the quench chamber.

Solid heat exchange material which is conventionally used in pebble heater apparatus is generally called "pebbles." The term pebbles as used herein denotes any solid refractory material of flowable size and form, having strength, which is suitable to carry large amounts of heat from the pebble heating chamber to the reaction chamber without rapid deterioration or substantial breaking. Pebbles conventionally used in pebble heater apparatus are substantially spherical in shape and range from about 1/8 inch to about 1 inch in diameter. In a high temperature process, pebbles having a diameter of between about 1/8 inch and 3/8 inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, thoria, beryllia, stellite, zirconia, and mullite may be satisfactorily used to form such pebbles or may be used in admixture with each other or with other materials. Pebbles formed of such materials, when properly fired, serve very well in high temperatures. Some pebbles, such as mullite-alumina pebbles, withstand temperatures up to about 3500° F. Pebbles which are used may be either inert or catalytic, as used in any selected process.

An object of this invention is to provide an improved method for operation of pebble heater apparatus. Another object of the invention is to provide improved means for quenching reaction products in pebble heater apparatus. Another object of the invention is to provide means for preventing the formation of coke adjacent reaction product outlets of reaction chambers of pebble heater apparatus. Another object of the invention is to provide an improved method for removing tarry material from reaction products. Another object of the invention is to provide an improved pebble heater apparatus. Other and further objects and advantages will be apparent to those skilled in the art upon study of the accompanying discussion and the drawings.

Understanding of this invention will be facilitated on reference to the diagrammatic drawings in which.

Figure 1:
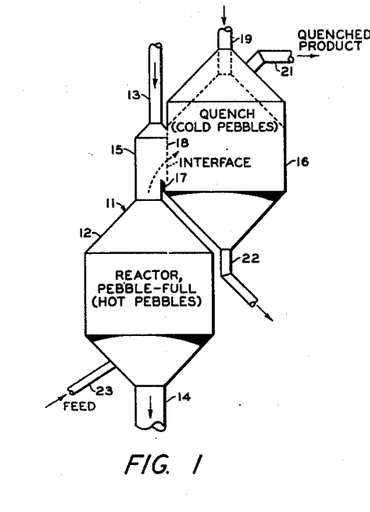
Figure 1 is a schematic elevation of a combination reactor-quench pebble chamber of this invention for countercurrent solid and fluid flow therethrough.

Referring particularly to Figure 1 of the drawings combination reactor-quench pebble chamber 11 comprises upright reactor chamber 12 having a centrally disposed pebble inlet conduit 13 in its upper end portion and a centrally disposed pebble outlet conduit 14 in its lower end portion. The upper end portion of chamber 12 is formed as an extension 15 which extends upwardly and is affixed to the wall of quench chamber 16. Chambers 12 and 16 have a common wall 17, the lower portion of which is preferably offset into extension 15 of chamber 12. An opening 18 is provided in the common wall portion of chambers 12 and 16 which provides communication between the two chambers. Pebble inlet conduit 19 is provided in the upper end portion of chamber 16 as is quenched product outlet conduit 21. Pebble outlet conduit 22 extends from the lower portion of quench chamber 16. Reactant material inlet conduit 23 extends into the lower portion of chamber 12. Although the drawing diagrammatically shows conduit 23 as communicating with the lower portion of chamber 12 as only a single point that conduit may communicate with the lower portion of shell 12 by means of a header, not shown, or by means of a plurality of branch conduits, likewise not shown.

Figure 2:
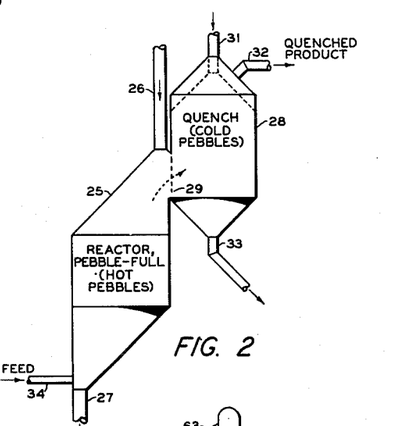
Figure 2 is a schematic elevation of a modified combination reactor-quench pebble chamber for countercurrent solid material and fluid flow.

In Figure 2 of the drawings, upright reactor chamber 25 is provided at its upper end with a pebble inlet conduit 26 and at its lower end with a pebble outlet conduit 27, which conduits are offset from the longitudinal axis of chamber 25 on opposite sides of the chamber. Quench chamber 28 is rigidly affixed to the upper end portion of the wall of chamber 25 on the side adjacent pebble inlet conduit 26 so that the lower wall portion of chamber 28 is common with the upper wall portion of chamber 25. An opening 29 through the common wall portion of the two chambers provides communication therebetween. It is preferred that the common wall portion at the bottom of the opening between the two chambers be offset slightly into reactor chamber 25. Chamber 28 is provided with a pebble inlet conduit 31 and a quenched product outlet conduit 32 in its upper end portion and pebble outlet conduit 33 in its lower end portion. Reactant material inlet conduit 34 is provided in reactor chamber 25 preferably in the lower portion of that chamber and adjacent pebble outlet conduit 27 therein.

Figure 3:
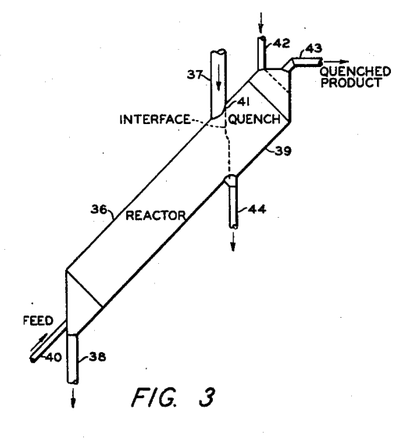
Figure 3 is a schematic elevation of another modified combination reactor-quench pebble chamber for the countercurrent contact of solid material and fluid.

In Figure 3 of the drawings, reactor chamber 36 extends obliquely upwardly and is provided in its upper end with pebble inlet conduit 37 and in its lower end with pebble outlet conduit 38 and reactant material inlet conduit 49. Upright quench chamber 39 is rigidly affixed to the upper end of chamber 36 and an opening 41 provides pebble and gas communication between the two chambers. Chamber 39 is provided with pebble inlet conduit 42 and quenched product outlet conduit 43 in its upper end and with pebble outlet conduit 44 in its lower end portion which outlet conduit is offset slightly into reactor chamber 36. Reactor chamber 36 is obliquely positioned so that gas passing therethrough will not be caused to change its direction of flow and will not be allowed to cool within the reactor by reason of the loss of energy during the change in direction.

Figure 4:
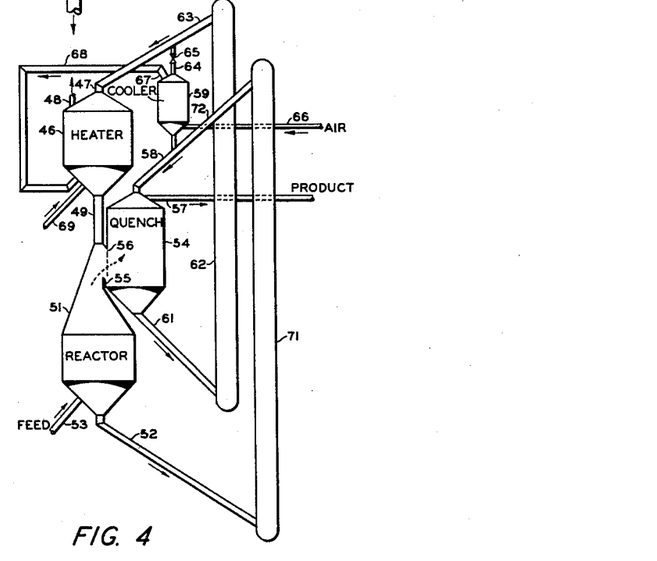
Figure 4 is a schematic elevation of pebble heater apparatus for countercurrent contact of solid materials and fluids.

In Figure 4 of the drawings, pebble heater chamber 46 is provided with a pebble inlet conduit 47 and an effluent outlet conduit 48 in its upper end portion and with a pebble outlet conduit 49 in its lower end portion. Reactor chamber 51 is connected at its upper end portion with the lower end of conduit 49. Reactor chamber 51 is provided with a pebble outlet conduit 52 and a reactant material inlet conduit 53 in its lower end portion. The upper end portion of reactor chamber 51 extends upwardly and is rigidly affixed to the lower end portion of the side wall of quench chamber 54. Reactor chamber 51 and quench chamber 54 have a common wall portion 55 through which an opening 56 provides communication between the two chambers. The lower portion of the common wall 55, which is below opening 56, is preferably offset slightly into reactor chamber 51. Quenched product outlet conduit 57 extends from the upper end portion of quench chamber 54. Pebble conduit 58 extends between the upper end portion of quench chamber 54 and the lower end portion of cooler chamber 59. Pebble outlet conduit 61 extends between the lower end of quench chamber 54 and the lower end portion of elevator 62. Pebble conduit 63 extends between the upper end portion of elevator 62 and pebble inlet conduit 47 in the upper end of heater chamber 46 and pebble inlet conduit 64 in the upper end of cooler chamber 59. Flow control valve 65 may be a star valve or any conventional flow control means for controlling the flow of pebbles into cooler chamber 59. Air inlet conduit 66 is provided in the lower portion of cooler 59 and air outlet conduit 67 is provided in the upper portion of cooler 59. Conduit 68 extends between air outlet conduit 67 and the lower portion of heater chamber 46. Fuel inlet conduit 69 is provided in the lower portion of heater chamber 46 adjacent conduit 68. Although the drawing diagrammatically shows air conduit 68 and fuel conduit 69 as entering heater chamber 46 at separate points, the two conduits may be joined by a header member, not shown, which can be in the form of a combustion chamber or which may act only to convey a mixture of fuel and air to the lower portion of heater chamber 46.

The operation of the combined reactor-quench chamber apparatus of Figures 1, 2, and 3 is the same as the combined reactor-quench chamber shown in Figure 4 of the drawings. The description of the operation of the device of Figure 4 is therefore used to describe the operation of the devices of Figures 1, 2, 3, and 4. In the operation of the device of Figure 4, pebbles are passed into pebble heater chamber 46 through pebble inlet conduit 47. The pebbles form a flowing contiguous bed of solid heat exchange material therein which gravitates downwardly through the chamber. Heating material, such as a hydrocarbon fuel, and air are introduced into the lower portion of heater chamber 46 through conduits 69 and 68 and the combustible material is burned on the surface of the gravitating pebbles in the lower portion of heater chamber 46. This operation is at times modified by burning the fuel in the presence of the air at a point outside of heater chamber 46 and the hot combustion gases are then introduced into the lower portion of the heater chamber and pass upwardly through the heater countercurrent to the flow of gravitating pebbles therein. The combustion gas resulting from the combustion of fuel outside or in the heater chamber passes upwardly through heater chamber 46 and is removed from the upper portion of that chamber through effluent outlet conduit 48. Heated pebbles gravitate through conduit 49 into reactor chamber 51 and form a flowing contiguous pebble bed therein. Additional pebbles are passed into cooler chamber 59 through flow control means 65 and conduit 64. Air is introduced through conduit 66 into the lower portion of cooler chamber 59 and passes upwardly countercurrent to the flow of gravitating pebbles therein and is removed from the upper portion of that chamber through outlet conduit 67.

The pebbles which are introduced into cooler chamber 59 are ordinarily at a higher temperature than is the air provided through conduit 66. The air is therefore heated and the pebbles are cooled in the direct heat exchange in chamber 59. The heated air is passed by means of conduit 68 to the lower portion of heater chamber 46 or the above mentioned header member or combustion chamber, not shown. The pebbles which are cooled in the direct heat exchange with the air are removed from the lower portion of the cooler chamber through conduit 58 and are gravitated to the upper portion of quench chamber 54 in which they form a flowing contiguous bed which gravitates downwardly through that chamber. The hot pebbles which are introduced into reactor chamber 51 and the cold pebbles which gravitate through chamber 54 form a vertical interface at the opening 56 in the common wall between the two chambers. The lower portion of wall 55 is preferably offset slightly into reactor chamber 51 so that a small portion of the hot pebbles flows into the lower portion of quench chamber 54. The offset in the wall is not an absolute necessity. In that type of operation, however, uniform temperatures within the reactor chamber are maintained, for the cool pebbles which would offset the uniform temperature therein are prevented from flowing into reactor chamber 51.

Reactant materials are introduced into the lower portion of reactor chamber 51 through inlet conduit 53 where the hot pebbles provide heat of reaction for the conversion or treatment of the reactant materials. Reaction products pass upwardly through the reactor chamber and flow through opening 56 into the cold pebble bed of quench chamber 54 and are removed from the upper end portion of chamber 54 through quenched product outlet conduit 57. Any tarry materials which may be present in the reaction products from the reactor chamber are laid down on the cold pebble surfaces and are removed from quench chamber 54 with pebbles which are gravitated from chamber 54 through pebble outlet conduit 61. The pebbles from quench chamber 54 are elevated by means of elevator 62 to the upper portions of heater chamber 56 and cooler chamber 59. Pebbles which have been cooled in the direct heat exchange with the reactant materials in reactor 51 are gravitated from reactor chamber 51 through pebble outlet conduit 52 and are elevated by means of elevator 71 to pebble conduit 72 which extends between the upper end of elevator 71 and the pebble conduit 58. The pebbles from reactor 51 are conveyed thereby into the upper end portion of quench chamber 54 along with cooled pebbles from cooler chamber 59.

The upper ends of reactor chambers 12, 25, 36, and 51 are sloped so that these portions of the chambers have steeper slopes than the angle of repose of the pebbles which are passed into those chambers. Pebbles which are supplied to the reaction chambers through the pebble inlet conduits tend to assume the angle of repose which may be defined as that angle, taken from the horizontal, which the top of a mass of pebbles will assume when poured from a central outlet.

The angle of repose generally varies between 30° and 45° from the horizontal, depending upon the size, shape, and type surface of the pebbles. By constructing the reactor chambers in this manner, it is obvious that there is no void space in which the reaction products can accumulate along the wall of the chamber where further decomposition will cause carbon lay-down. The reactor chambers are always pebble full and the abrasive action of the pebbles against the chamber walls is sufficient to remove any carbon lay-down from the chambers.

Figure 5:
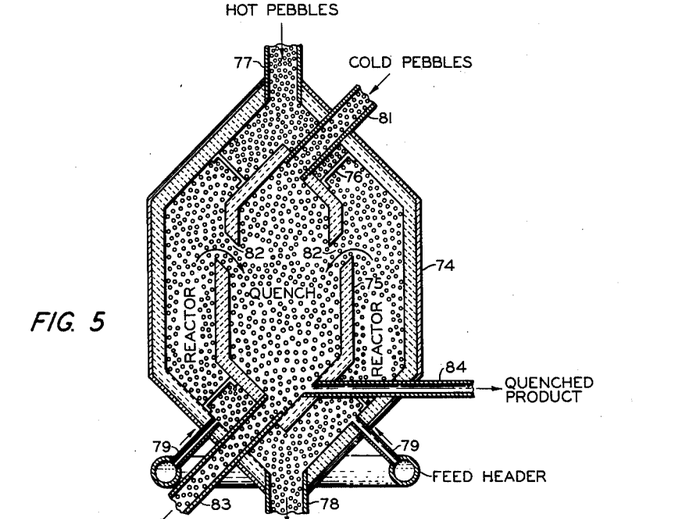
Figure 5 is a schematic elevation of another modification of a combination reactor-quench pebble chamber of this invention for concurrent flow of solid material and fluid in the quench chamber.

Referring now to Figure 5 of the drawings, reactor chamber 74 and quench chamber 75 are upright concentric chambers, chamber 75 being considerably smaller in diameter and shorter than chamber 74. Chamber 75 is maintained in position by hanger members 76 extending between the walls of chamber 74 and chamber 75. Reactor chamber 74 is provided with a pebble inlet conduit 77 centrally disposed in its upper end and a pebble outlet conduit 78 centrally disposed in its lower end. Reactant material inlet conduit 79 is provided in the lower end portion of chamber 74. Chamber 75 is provided with a pebble inlet conduit 81 which extends through the wall of chamber 74 and into the upper end portion of chamber 75. Openings 82 are provided in the upper end of the upright walls of chamber 75. Pebble outlet conduit 83 and quenched product outlet conduit 84 extend from the lower portion of quench chamber 75 through the walls of reactor 74.

Figure 6:
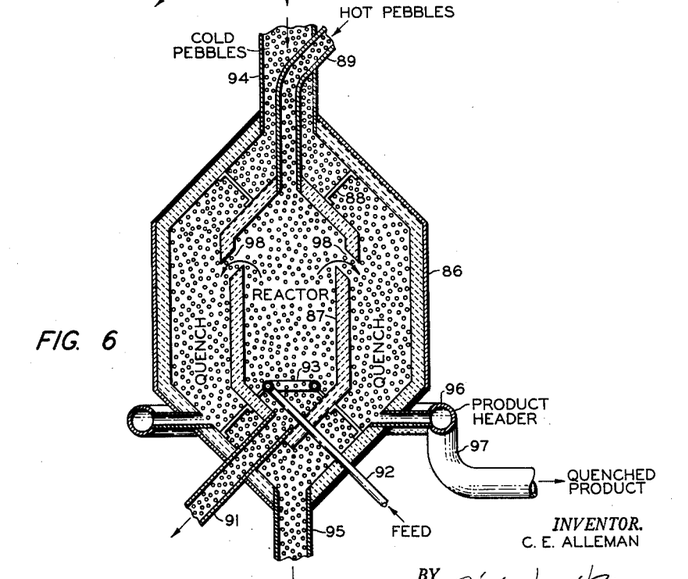
Figure 6 is a schematic elevation of a modified combination reactor quench pebble chamber of this invention for concurrent contact of solid material and fluids in the quench chamber.

The device of Figure 6 is somewhat similar to that shown in Figure 5 except that quench chamber 86, which is concentric with reactor 87, is somewhat larger in diameter than reactor chamber 87 and of greater length. The inner chambers shown in Figures 5 and 6 are spaced from the top and bottom of the outer chambers so as to allow pebble flow therebetween. Reactor chamber 87 is maintained in position by hanger members 88 extending between the walls of chambers 86 and 87. Pebble inlet conduit 89 extends centrally into the upper end of reactor chamber 87. Pebble outlet conduit 91 extends from the lower end of reactor 87 through a wall of chamber 86. Reactant material inlet conduit 92 extends through the walls of chambers 86 and 87 into the lower portion of the reactor and communicates with reactant material distribution member 93 which is disposed across the lower portion of the reactor chamber. Pebble inlet conduit 94 is provided in the upper end of chamber 86 and may be concentric with conduit 89 throughout a portion of its length. Pebble outlet conduit 95 is provided in the lower end of chamber 86. Product header 96 extends around at least a portion of the lower end of chamber 86 and is provided with openings into the interior of chamber 86. Quenched product outlet conduit 97 extends from product header 96. Openings 98 are provided in the upper end of the upright walls of reactor chamber 87. The portion of the wall immediately below openings 98 is preferably offset slightly into reactor chamber 87 while in the device shown in Figure 5 the portion of the wall immediately below openings 82 is preferably offset slightly outwardly into the reactor chamber. Openings 82 and 98 may be sloped downwardly, as shown, toward the quench chambers. This slope of openings 82 and 98 may be used either in addition to or in place of offsetting the wall portions immediately below these openings.

Figure 7:
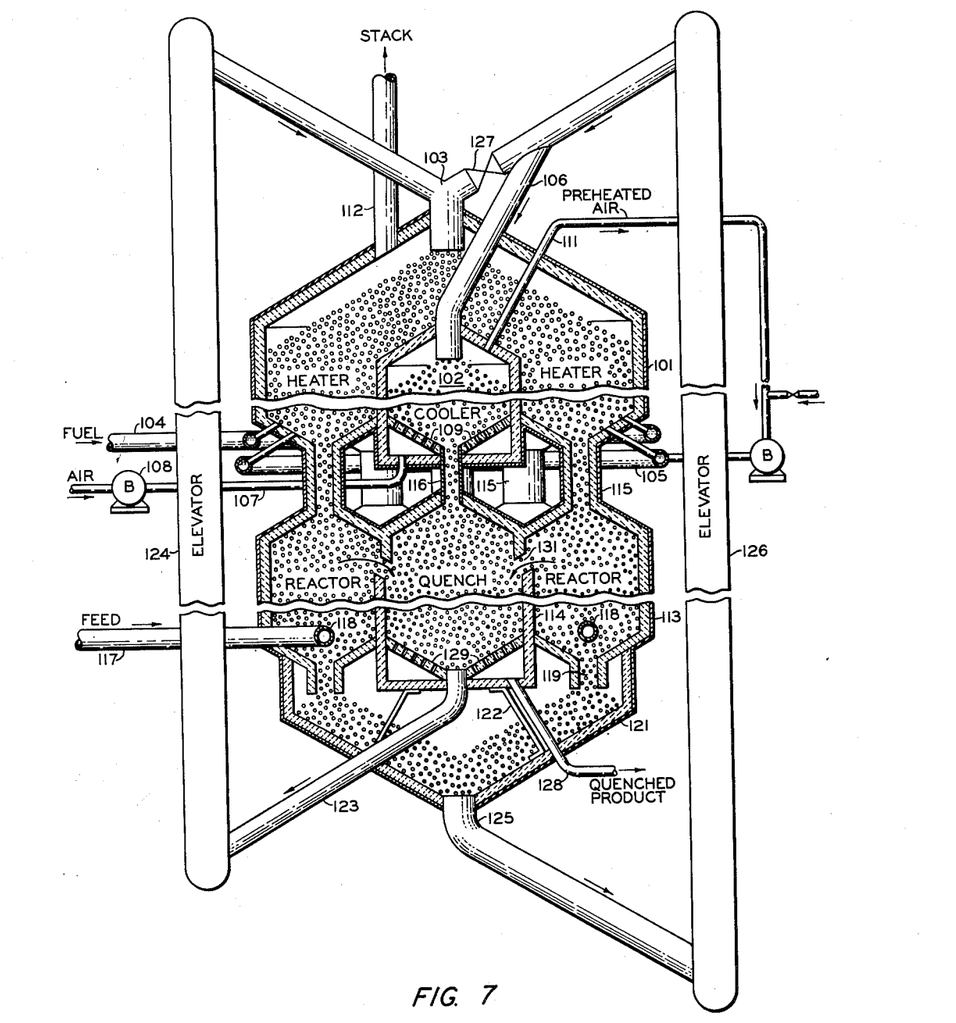
Figure 7 is a schematic elevation of a modified pebble heater apparatus of this invention for concurrent contact of solid material and fluids in the quench chamber.

In Figure 7 of the drawings, heater chamber 101 and cooler chamber 102 are concentric chambers, chamber 101 being considerably larger in diameter than cooler 102. The upper end of cooler chamber 102 is spaced downwardly from the upper end of chamber 101 to provide a pebble passage therebetween. Pebble inlet conduit 103 is provided in the upper end of chamber 101 and is shown to be centrally located. However this inlet may be divided into a plurality of inlets positioned immediately above the annulus forming the heating chamber. Fuel inlet conduit 104 is provided around the lower end of chamber 101 and communicates with the interior of that chamber through openings therebetween. Air conduit 105 extends in the form of header member around the lower end of heater chamber 101 adjacent fuel conduit 104 and also communicates with the interior of heater chamber 101 through openings therebetween. Pebble inlet conduit 106 extends from the upper end of cooler chamber 102 through the upper end wall of chamber 101. Air inlet conduit 107 extends between a pressurizing mechanism, such as blower 108, and the lower end portion of chamber 102. A perforate support member 109 provides an air distribution chamber in the lower portion of cooler chamber 102 and provides air passages therethrough. Support member 109 is preferably in the form of a cone which extends upwardly and outwardly from a central opening in the bottom of chamber 102 to its side walls. Effluent outlet conduit 111 extends from the upper end portion of chamber 102 through the upper end portion of chamber 101 to air inlet conduit 105. Effluent outlet conduit 112 is provided in the upper end portion of chamber 101.

Reactor chamber 113 and quench chamber 114 are concentric chambers, reactor chamber 113 being considerably larger in diameter than quench chamber 114. At least one pebble conduit 115 extends between the lower end of chamber 101 and the upper end of chamber 113. Conduit 116 extends between the lower end of cooler 102 and quench chamber 114. Reactant material inlet conduit 117 extends into reactor chamber 113 and is connected to distributor member 118 which encircles at least a portion of quench chamber 114. The lower end of reactor 113 is formed as a trough or a V-shaped receiver which has at least one outlet conduit 119 opening into a common collector chamber 121. Quench chamber 114 and one side of the bottom or trough of chamber 113 is maintained in position by hanger members 122. Pebble outlet conduit 123 extends from the lower end of chamber 114 through the lower end wall of chamber 121 and connects with the lower end portion of elevator 124. The upper end of elevator 124 is connected to pebble inlet conduit 103. Pebble outlet conduit 125 extends from the lower end of collector 121 and is connected to the lower end of elevator 126. The upper end of elevator 126 is connected to pebble inlet conduit 103 and pebble inlet conduit 106. Flow control means, such as a star or variable orifice valve 127, is provided in the elevator means intermediate a take-off to pebble inlet conduit 106 and conduit 103. Quenched product outlet conduit 128 extends from the lower end of chamber 114 through the lower end wall of chamber 121. Perforate support member 129 provides a separation space in the lower portion of chamber 114 and provides fluid passageways from the interior of chamber 114 into the separation space.

Openings 131 are provided in the upper end of the vertical walls of the chamber 114.

The operation of the devices shown in Figures 5 and 6 is very similar to the operation of the combination reactor-quench chamber shown in Figure 7 of the drawings. The operation of the devices of the three figures is therefore described generally in connection with Figure 7 of the drawings. In the operation of the device of Figure 7, pebbles are introduced into heater chamber 101 through pebble inlet conduit 103 disposed in its upper end portion. The pebbles gravitate downwardly through the heater chamber and form a flowing contiguous pebble bed therein. Additional pebbles are introduced into the upper end portion of cooler chamber 102 through pebble conduit 106 and form a flowing contiguous pebble bed therein. Air which is pressurized by blower 108 is passed by means of conduit 107 into the lower portion of cooler chamber 102. The air is distributed below the conical pebble support member 109 and passes through the perforate member into the lower portion of the cooler chamber and upwardly through that chamber countercurrent to the flow of pebbles therethrough. Ordinarily the air is at a lower inlet temperature than the temperature of the pebbles within the chamber 102. In a direct heat exchange between the air and pebbles within cooler chamber 102 the air is heated and the pebbles are cooled. The heated air is passed by means of conduit 111 to header member 105 disposed about the lower end of heater chamber 101. Fuel is supplied by means of conduit 104, which may terminate in a header member about the lower end of heater chamber 101, to the lower portion of heater chamber 101. Air for combustion is supplied through header member 105.

It is within the scope of this disclosure that the fuel and air may be mixed at a point outside of the heater chamber and burned in a separate combustion chamber. In either case, hot combustion gases resulting from the combustion of the fuel in the presence of the heated air are passed upwardly through the header chamber countercurrent to the flow of the pebbles therethrough. Gaseous effluent material is removed from the upper end of header chamber 101 through effluent outlet conduit 112. Heated pebbles from chamber 101 gravitate through a plurality of pebble conduits 115 into the upper end portion of reaction chamber 113 and form a flowing contiguous pebble bed therein. Cooled pebbles from cooler chamber 102 gravitate through pebble conduit 116 into the upper end portion of quench chamber 114 and form a flowing contiguous pebble bed therein. The beds of hot and cold pebbles in chambers 113 and 114, respectively, are contiguous and form a vertical interface through the openings 131 in the upper end of the upright wall of quench chamber 114. The wall portion directly below the openings 131 preferably protrude slightly into reactor chamber 113 so that cold pebbles are prevented from flowing into the hot reactor chamber by selecting a small portion of the hot pebbles and drawing them into the quench chamber. Openings 82 and 98 may be sloped downwardly, as shown, toward the quench chambers. This slope of openings 82 and 98 may be used either in addition to or in place of offsetting the wall portions immediately below these openings.

Reactant materials are fed by means of conduit 117 and distributor 118 into the lower portion of reactor chamber 113. Heat of reaction for the reactant materials is provided to the reactant materials by the hot pebbles in chamber 113 as they pass countercurrent to the flow of pebbles through chamber 113. Resulting reaction products pass from reactor chamber 113 through openings 131 into quench chamber 114 and flow concurrent to the flow of pebbles downwardly through chamber 114 and pass through the perforations in conical pebble support member 129 into the separation space in the lower end of quench chamber 114. The quenched product is removed from the bottom of quench chamber 114 through outlet conduit 128.

Pebbles from quench chamber 114 are removed through pebble conduit 123 and are elevated by means of elevator 124 to pebble conduit 103 in the upper end of heater chamber 101. Pebbles which have given up much of their heat to the reactant materials in the direct heat exchange in reactor chamber 113 gravitate downwardly through the outlet openings in the bottom of that chamber into collector chamber 121 from which the pebbles are gravitated by means of conduit 125 to the lower end of elevator 126 by which they are elevated to the upper end of pebble conduits 103 and 106 in the upper ends of heater chamber 101 and cooler chamber 102, respectively. Flow control means 127 is operated so as to assure a sufficient flow of pebbles through cooler chamber 102 and so as to allow any remaining portion of pebbles to be recycled to heater chamber 101.

The operation of the device shown in Figure 5 of the drawings is similar to that which is described in connection with the reactor and quench chambers of Figure 7. The main difference in structure of the device of Figure 5 as compared to the combination reactor-quench chamber of Figure 7 is that no separation space is provided in the lower end of the quench chamber of Figure 5. Quenched products are removed directly from the pebbles to the exterior of the reactor chamber in Figure 5. Flow of reaction products is from the reactor chamber inwardly through the openings 82 in the upper end of the upright wall of chamber 75 and concurrent to the flow of the cold pebbles downwardly through the quench chamber. The operation of the device shown in Figure 6 of the drawings is similar thereto in that the flow of reaction products is concurrent to the flow of cold pebbles through the quench chamber. In that device, however, the reactor chamber is the inner chamber and the reaction products flow outwardly from the reactor to the quench chambers and downwardly through the quench chamber, and are removed through quench product outlet conduit 97. The flow of reaction products into the pebble inlet end of the quench chamber has the advantage of obtaining a more nearly instantaneous quench when meeting first the coldest portion of the pebble stream and flowing concurrent the pebbles than when flowing countercurrent the pebbles. However, heat recovery will not be as good and the final temperature of the quenched product will not be as low with concurrent flow as it is with countercurrent flow, other things being equal.

Although the diagrammatic drawings do not, for the purpose of simplification, contain a showing of conduits connected to the various pebble throats by which an inert gas, such as steam, may be provided to the throats to prevent the passage of reaction products through these throats, it is within the scope of this disclosure that such conduits are advantageously utilized in the operation of pebble heater devices such as disclosed herein.

This invention is particularly adaptable to cracking light hydrocarbons, such as for the production of ethylene. The invention is also used for cracking residual hydrocarbon fractions to coke. If delayed coking is employed, this coke is laid down on the cool pebbles in the quench chamber and is subsequently removed in the heating chamber. This invention is also used for carrying out high velocity high temperature reactions such as acetylene production which requires very short residence time and very quick quench, i. e., requires a minimum of residence time between reaching the maximum reaction temperature and being qunched below dissociating temperature.

The apparatus and the method of operation which has been disclosed above is very flexible and may be used in any number of operations. Various modifications and other advantages will be apparent to those skilled in the art upon study of the accompanying disclosure. For instance, the chambers represented in Figures 5, 6, and 7 may be relatively long and rectangular with a common longitudinal axis rather than being concentric round chambers. It is believed that such modifications are within the spirit and the scope of the disclosure.

I claim:

1. A combination reactor-quench pebble apparatus which comprises a first shell having a pebble inlet in its upper end and a pebble outlet in its lower end; a first fluid conduit in the lower end of said first shell for introducing a reactant fluid into said first shell; a first flowable bed of pebbles in said first shell; a second shell having a pebble inlet in its upper end, a pebble outlet in its lower end and communicating with said first shell through at least one substantially vertically extending opening of such substantial size and arrangement as to permit flow of reaction products from said first shell to said second shell through the pebbles therein and to permit flow of said pebbles in the respective shells in contiguous movement; a second fluid conduit in one end of said second shell for discharge of quenched product from said second shell; a second flowable bed of pebbles in said second shell, said second flowable bed of pebbles forming a vertical interface at said opening with said first flowable bed of pebbles.

2. The apparatus of claim 1, wherein said first and second shells are concentric, said second shell being of considerably smaller diameter and shorter than said first shell and spaced at each end from said first shell to allow pebble flow therebetween; said pebble inlet, pebble outlet, and second fluid conduit in said second shell extending from said second shell through the walls of said first shell; and wherein there are a plurality of vertically extending communicating openings in said second shell in an end portion of the upright wall of said second shell.

3. The apparatus of claim 2, wherein said second fluid conduit is in the lower end portion of said second shell; and said plurality of openings is in the upper end portion of the upright wall of said second shell.

4. The apparatus of claim 3, wherein said second fluid conduit extends into the lower central portion of said second shell; and a fluid distributor centrally disposed in the lower portion of the chamber within said second shell and connected to said second fluid conduit.

5. The apparatus of claim 4, wherein the top of said second shell is shaped downwardly from said pebble inlet therein at an angle of at least 30° from the horizontal.

6. The apparatus of claim 1, wherein said first and second shells are adjacent and have an upright common wall portion, said opening being disposed in said common wall portion.

7. The apparatus of claim 6, wherein said pebble inlet and said pebble outlet of said first shell are offset from the longitudinal axis on opposite sides of said first shell; and said first and second shells have a common wall in the side at which the pebble inlet to said first shell is disposed, the common wall portion being in the upper portion of said first shell.

8. The apparatus of claim 7, wherein said first fluid conduit extends into the lower portion of the chamber within said first shell at the side at which said pebble outlet is disposed.

9. The apparatus of claim 1, wherein said first shell has an extended portion protruding centrally from its upper end; said pebble inlet and pebble outlet in said first shell being centrally disposed; and said first and second shells being adjacent and a common wall portion being formed between said central extension of said first shell and the lower portion of said second shell; said substantially vertical opening being in said common wall portion.

10. The apparatus of claim 9, wherein the top of said first shell is shaped downwardly from said pebble inlet therein at an angle of at least 30° from the horizontal.

11. Improved pebble heater apparatus comprising in combination a pebble heater; a heating fluid inlet in the lower portion of said pebble heater; a gaseous material outlet in the upper portion of said pebble heater; a cooler; a pebble inlet in the upper portion of said cooler; a cooling fluid inlet in the lower portion of said cooler; a gaseous material outlet in the upper portion of said cooler and extending to the lower portion of said pebble heater; a reactor; a feed material inlet conduit in the lower end portion of said reactor; at least one pebble conduit extending between the lower portion of said pebble heater and the upper portion of said reactor; a quencher having a substantially vertical wall portion which is common with said reactor; at least one opening through said substantially vertical wall portion which is common with said reactor, said opening being large enough to permit flow of reactant products from said reactor through said quencher at least one pebble conduit extending between the lower portion of said cooler and the upper portion of said quencher; pebble outlet means from the lower portion of said reactor; pebble outlet means from the lower portion of said quencher; elevation means extending between said pebble outlet means from said quencher and a pebble inlet conduit in the upper portion of said pebble heater; and a quench product outlet conduit from said quencher.

12. The heater apparatus of claim 11, wherein elevation means are provided extending between the pebble outlet means in the lower portion of said reactor and said pebble conduit extending between the lower portion of said cooler and the upper portion of said quencher; and said elevation means from said quencher extends to the upper portion of said heater and said cooler.

13. Improved pebble heater apparatus comprising in combination a pebble heater; a heating fluid inlet in the lower portion of said pebble heater; a gaseous material outlet in the upper portion of said pebble heater; a cooler; a cooling fluid inlet in the lower portion of said cooler; a gaseous material outlet in the upper portion of said cooler and extending to the lower portion of said pebble heater; a reactor; at least one pebble conduit extending between the lower portion of said pebble heater and the upper portion of said reactor; a quencher having a substantially vertical wall portion which is common with said reactor; at least one opening through said substantially vertical wall portion which is common with said reactor, said opening being large enough to permit flow of reactant products from said reactor through said quencher at least one pebble conduit extending between the lower portion of said cooler and the upper portion of said quencher; pebble outlet means from the lower portion of said reactor; pebble outlet means from the lower portion of said quencher; elevation means extending between said pebble outlet means from said quencher and a pebble inlet conduit in the upper portion of said pebble heater; elevation means extending between the pebble outlet means in the lower portion of said reactor and a pebble inlet in the upper portion of said cooler; and a quench product outlet conduit from said quencher.

14. A method for reacting fluids in the presence of hot particulate solids and quenching resulting reaction products, which comprises in combination the steps of passing particulate solid material into a heating zone; burning a combustible fuel; passing resulting hot combustion gases upwardly through said heating zone in direct heat exchange with said particulate solid material; removing gaseous effluent material from the upper portion of said heating zone; gravitating heated particulate solids from said heating zone into a reaction zone; introducing reactant fluid into the lower portion of said reaction zone and reacting said materials in the presence of said heated solids; passing additional particulate solid material into a cooling zone; passing air through said cooling zone to cool said solid material therein and heat said air; using said heated air to burn said combustible fuel; gravitating said cooled solid material from said cooling zone to a quenching zone; gravitating said solid materials in said reaction zone and said quenching zone in a state of contiguity so as to form an interface therebetween through at least a portion of the lengths of said zones; passing resulting reaction products from said reaction zone into said contiguous quenching zone and into the presence of said cooled solid material therein; removing quenched products from said quenching zone; gravitating said solid material from said reaction zone; and gravitating said solid material from said quenching zone.

15. The method of claim 14, wherein said solid material from said quenching zone is returned to the upper portion of said heating zone; and said solid material from said reaction zone is returned to said cooling zone.

16. The method of claim 14, wherein said solid material from said quenching zone is returned to said heating zone and said cooling zone; and said solid material from said reaction zone is returned to said quenching zone.

17. Improved pebble heater apparatus comprising in combination a pebble heater; a heating fluid inlet in the lower portion of said pebble heater; a gaseous material outlet in the upper portion of said pebble heater; a reactor; a pebble conduit extending between the lower portion of said pebble heater and the upper portion of said reactor; a quencher having a substantially vertical wall portion which is common with said reactor; at least one opening through said substantially vertical wall portion and being of sufficient size and arrangement to permit flow of reaction products from said reactor through said quencher; pebble outlet means from the lower portion of said reactor; pebble outlet means from the lower portion of said quencher; elevation means extending between said pebble outlet means from said reactor and said quencher; elevation means extending between said pebble outlet means from said quencher and the upper portion of said pebble heater; reactant material inlet means in the lower portion of said reactor; and a quench product outlet conduit from said quencher.

18. A combination reactor-quench pebble apparatus which comprises a first shell having a pebble inlet in its upper end and a pebble outlet in its lower end; a first fluid conduit in the lower end of said first shell for introducing a reactant fluid into said first shell; a second shell having a pebble inlet in its upper end, a pebble outlet in its lower end, and having a substantially vertical wall common to said first shell; at least one substantially vertical opening, to permit flow of reaction products from said first shell to said second shell, between the chambers formed by said shells through said common wall, said opening being of sufficient size to permit flow of reaction products from said first shell to said second shell through pebbles when present therein and to permit the flow of such pebbles in the respective shells in contiguous movement; and a second fluid conduit in one end of said second shell for discharge of quenched product from said second shell.

19. A combination reactor-quench pebble apparatus which comprises a first shell having a pebble inlet in its upper end and a pebble inlet in its lower end; a first fluid conduit in the lower end of said first shell; an extended portion protruding centrally from the upper end of said first shell; a second shell having a pebble inlet in its upper end and a pebble outlet in its lower end; said pebble inlets in said first and second shells being centrally disposed; said first and second shells being adjacent and having a common wall portion between said extended portion of said first shell and the lower portion of said second shell; a substantially vertical opening in said common wall portion said opening being of sufficient size to permit flow of reaction products from said first shell to said second shell through pebbles when present therein and to permit the flow of such pebbles in the respective shells in contiguous movement; and a second fluid conduit in the upper end portion of said second shell.

20. Improved pebble heater apparatus comprising a circular pebble heater; pebble inlet means in the upper portion of said pebble heater; a heating fluid inlet in the lower portion of said heater; a gaseous material outlet in the upper portion of said pebble heater; a cooler chamber concentrically positioned with respect to said heater to said heater extending upwardly into said heater chamber and spaced downwardly from the upper end of said pebble heater; a pebble inlet in the upper portion of said cooler; a cooling fluid inlet extending into the lower portion of said cooler; a gaseous material outlet in the upper portion of said cooler extending outwardly through said pebble heater and being connected at its upper end to the lower end portion of said pebble heater; a circular reactor; a feed material conduit in the lower portion of said reactor; at least one pebble conduit extending between said lower portion of said pebble heater and the upper portion of said reactor; a pebble quench chamber concentrically disposed within said reactor and having a substantially vertical wall portion common with the inner wall of said reactor; at least one opening through the upper portion of said substantially vertical wall portion, said opening being large enough to permit the flow of reactant products from said reactor through said quencher; pebble outlet means from said reactor comprising at least one outlet conduit from said reactor, a pebble collector below said pebble outlet from said reactor, and a pebble outlet conduit in the bottom of said pebble collector; at least one pebble conduit extending between the lower portion of said cooler and the upper portion of said quencher; pebble outlet means from the lower portion of said quencher; an elevator extending between the said pebble outlet means from said quencher and said pebble inlet means in the upper portion of said pebble heater; an elevator extending between said pebble outlet means from said pebble collector to the pebble inlet in the upper portion of said cooler and quenched product outlet means extending from the lower end portion of said quencher.

CARL E. ALLEMAN.

References Cited in the file of this patent
UNITED STATES PATENTS

| Number | Name | Date |
|---|---|---|
| 2,013,973 | Scharff et al. | Sept. 10, 1935 |
| 2,418,837 | Houdry | Apr. 15, 1947 |
| 2,432,962 | Bergstrom | Dec. 16, 1947 |
| 2,439,730 | Happel | Apr. 13, 1948 |
| 2,443,337 | Weber | June 15, 1948 |
| 2,448,922 | Simpson et al. | Sept. 17, 1948 |
| 2,466,005 | Crowley, Jr. | Apr. 5, 1949 |